United States Patent

Faccia

[11] Patent Number: 5,175,917
[45] Date of Patent: Jan. 5, 1993

[54] COUNTERBLADE EXTRACTING DEVICE

[76] Inventor: Tiziano Faccia, Via Padova, 102-35026 Conselve (Prov. of Padova), Italy

[21] Appl. No.: 808,482
[22] Filed: Dec. 17, 1991

[30] Foreign Application Priority Data

Dec. 21, 1990 [IT] Italy .............................. 30739/90[U]

[51] Int. Cl.⁵ .............................................. B66F 3/00
[52] U.S. Cl. .................................................... 29/267
[58] Field of Search .................... 29/267, 239; 269/236

[56] References Cited
U.S. PATENT DOCUMENTS

| 3,071,848 | 1/1963 | Lawry et al. | 29/267 |
| 3,097,547 | 7/1963 | Krekeler | 29/267 |
| 3,315,340 | 4/1967 | King | 29/267 |
| 3,680,838 | 8/1972 | Dunn | 29/267 |
| 4,436,446 | 3/1984 | Gordon | 269/236 |
| 4,475,726 | 10/1984 | Smith | 269/236 |

Primary Examiner—Robert C. Watson
Attorney, Agent, or Firm—Guido Modiano; Albert Josif

[57] ABSTRACT

Counterblade extracting device for extracting counterblades pivoted in slots of a wall including a disk element which is rigidly associated with a lever-like actuation element and which is arranged adjacent to the side of the counterblade and rotatably coupled thereto outside the wall.

6 Claims, 1 Drawing Sheet

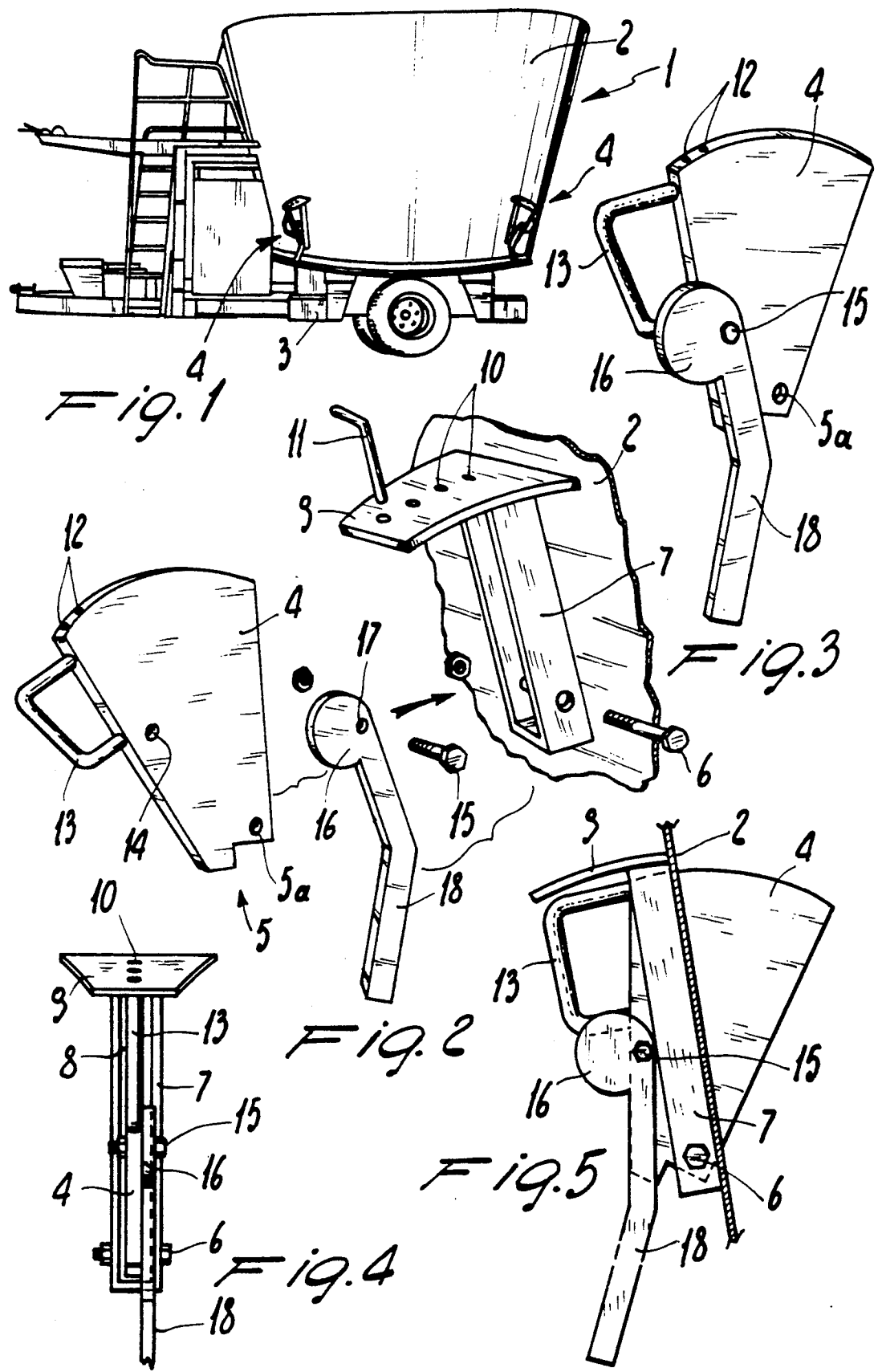

5,175,917

COUNTERBLADE EXTRACTING DEVICE

BACKGROUND OF THE INVENTION

The present invention relates to a counterblade extracting device, particularly for extracting the counterblades of trucks for shredding-mixing zootechnical fibrous products.

The use of shredding-mixing trucks with a vertical scroll to prepare fodder for livestock, in particular cattle, is known in the zootechnical field; said trucks are substantially constituted by a container in the shape of an inverted truncated cone arranged on a wheeled chassis inside which a scroll is arranged vertically; the profile of the helix of said scroll is arranged along an ideal conical surface.

Blades suitable for shredding the product being mixed, which is appropriately loaded from the top, are peripherally fixed to the scroll.

In order to contrast the rotary motion of the product being mixed, which is entrained by the rotating scroll, substantially radial counterblades are arranged at the lower part of the container and can be inserted and extracted through slots provided thereon.

Said counterblades are substantially constituted by disk sectors which are pivoted proximate to their vertex.

Extraction of the counterblades after insertion in the container can currently occur either simply manually, by means of handles appropriately applied to said counterblades, but this is particularly onerous due to friction and to the action exerted on said counterblades by the product inside the container, or by applying hydraulic jacks rigidly associated between the container and the blades.

However, the presence of the hydraulic jacks entails the execution of an offtake branch of the hydraulic circuit and necessarily entails the simultaneous actuation of all the counterblades, unless a distributor suitable for sending pressurized oil only to the desired counterblades is used.

This naturally entails rather considerable cost increases.

SUMMARY OF THE INVENTION

The aim of the present invention is to provide a counterblade extracting device, particularly for extracting the counterblades of trucks for shredding-mixing zootechnical fibrous products which can conveniently be operated manually without effort.

A consequent primary object is to provide a counterblade extraction device which allows to extract only the desired counterblades of a truck.

Another important object is to provide a counterblade extraction device which needs no hydraulic actuation means.

Still another object is to provide a counterblade extraction device which is easy and quick to manoeuvre.

Yet another object is to provide a counterblade extraction device which is easy to manufacture and has a low cost.

Not least object is to provide a counterblade extraction device which can conveniently be sold in a kit so that it can also be fitted on trucks already in use.

This aim, these objects and others which will become apparent hereinafter are achieved by a counterblade extraction device for extracting counterblades of the disk-sector type which are pivoted with their vertices to the container of a truck for shredding-mixing fibrous products at adapted substantially vertical slots thereof and are inserted in said container substantially in a radial position with respect to the internal mixing scroll, characterized in that it comprises an eccentric means rigidly associated with a lever-like actuation element, which is arranged adjacent to the side of said disk sector and is rotatably coupled thereto outside the container.

BRIEF DESCRIPTION OF THE DRAWINGS

Further characteristics and advantages of the invention will become apparent from the detailed description of an embodiment thereof illustrated only by way of non-limitative example in the accompanying drawings, wherein:

FIG. 1 is a perspective view of a truck for shredding-mixing fibrous products, wherein two counterblades are visible at the lower part of the container;

FIG. 2 is an exploded view of a counterblade with the extraction device according to the invention;

FIG. 3 is a perspective view of the assembly of a counterblade and of an extraction device;

FIG. 4 is a profile view of a counterblade and of the extraction device applied to the truck;

FIG. 5 is a sectional view of the wall of a truck in the region of a counterblade provided with the extraction device.

DESCRIPTION OF THE PREFERRED EMBODIMENTS

With reference to the above figures, a truck for shredding-mixing fibrous products is generally designated by the reference numeral 1 and substantially comprises a container 2 in the shape of an inverted truncated cone which is arranged on a wheeled chassis 3 and contains a vertical mixing scroll, not illustrated, whose profile is conveniently arranged on an ideal conical surface.

Advantageously, said scroll is provided with cutting blades which are perimetrically fixed thereto.

Counterblades 4 are arranged at the lower part of the container 2 and are substantially constituted by disk sectors made of sheet metal, whose vertex 5 is arranged downward, is provided with a hole 5a and is pivoted, by means of a bolt pivot 6, between the walls of a substantially parallelepipedal guiding element 7 which is fixed to the container 2 at an adapted substantially vertical slot 8.

Said guiding element 7 is substantially box-like and has two opposite sides which are open at the slot 8.

Above said guiding element 7 there is a laminar wing 9 which is perpendicular to the slot 8 and thus to the counterblade 4 whose perimetric shape it matches.

Said wing 9 is provided with aligned holes 10 for a pin 11 which is suitable for being inserted in holes 12 defined on the edge of the counterblade 4 to lock it at the required degree of insertion.

The counterblade 4 is furthermore provided with an actuation handle 13.

According to the invention, an eccentric means 16, substantially constituted by a disk-like element which is eccentrically provided with a hole 17 for a bolt pivot 15, is laterally pivotally articulated by means of the pivot 15 to said counterblade 4 at a hole 14 thereof which is adjacent to the radial portion of the profile of said counterblade which is external to the container 2.

A angled lever-like actuation element 18 conveniently extends from the disk-like element 16 tangentially to the region of the hole 17.

When the counterblade is fully inserted in the container 2, as seen in FIG. 5, the lever-like actuation element 18 is arranged downward with respect to the pivoting point and the eccentric means 16 rests on the guiding element 7 but is directed toward the outside of the container 2.

In order to perform extraction with minimal effort it is sufficient to raise the lever-like element 18 and thus rotate the eccentric means 16; by continuing to rest on the guiding element 7 with its profile, said eccentric means gradually extracts the counterblade 4.

Once the action of the device ends, extraction can be completed by means of the handle 13.

In practice it has thus been observed that the extraction device according to the invention has achieved the intended aim and objects.

Said device in fact makes the manual extraction of the counterblades less onerous, although it does not have to be necessarily coupled to hydraulic or at least automatic devices.

It is characterized by extremely simple execution and low cost and can thus be applied both to newly manufactured trucks and, by being sold separately, to trucks already in use.

In practice, the materials employed, so long as compatible with the contingent use, as well as the dimensions, may be any according to the requirements.

I claim:

1. Counterblade extracting device, particularly for extracting counterblades of the disk-sector type which are pivoted with their vertices to a container of a truck for shredding-mixing fibrous products at adapted slots thereof and which are insertable in said container through guiding elements at said slots thereof, comprising:
   an eccentric means rotatably coupled to said counterblade; and
   a lever-like actuation element rigidly associated with said eccentric means;
   wherein said eccentric means is arranged adjacent to a side of said counterblade, said side being external to said container, said eccentric means further resting on said guiding element for rotating in contact therewith and gradually extracting said counterblade from said container up to a required degree of insertion wherein said counterblade is lockable.

2. Device according to claim 1, wherein said eccentric means is constituted by a disk-like element provided with an eccentric hole for articulation to said disk sector.

3. Device according to claim 1, wherein the articulation of said eccentric means is provided by means of a bolt pivot.

4. Device according to claim 2, wherein said lever-like actuation element is constituted by an angled lever which extends from said disk-like element substantially tangentially from the region of said eccentric hole.

5. Device according to claim 1, wherein the perimetric profile of said eccentric means rests on the wall of said container for rotating in contact therewith and gradually extracting said counterblade from said container up to a required degree of insertion wherein said counterblade is lockable.

6. Device according to claim 2, wherein said eccentric means is pivotally associated with said counterblade by means of said pivot which is inserted in said hole thereof and in a hole defined on said counterblade proximate to the radial profile portion which is arranged outside the container.

* * * * *